Jan. 17, 1928.　　　　　　　　C. W. MANZEL　　　　　　　　1,656,744
HYDRAULIC SHOCK ABSORBER
Filed Jan. 8, 1927　　　　2 Sheets-Sheet 1
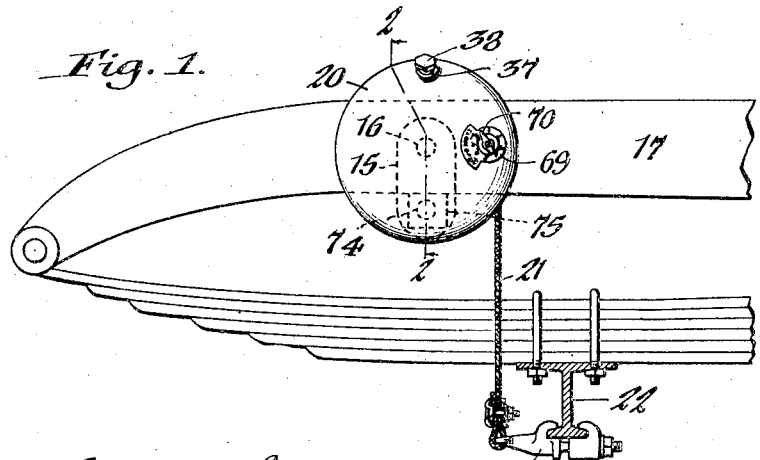
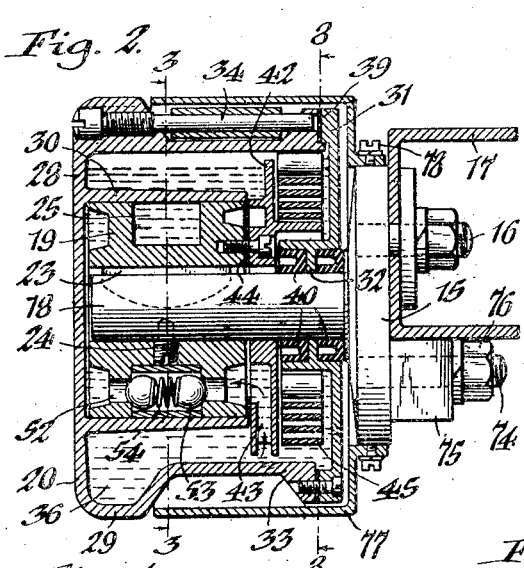
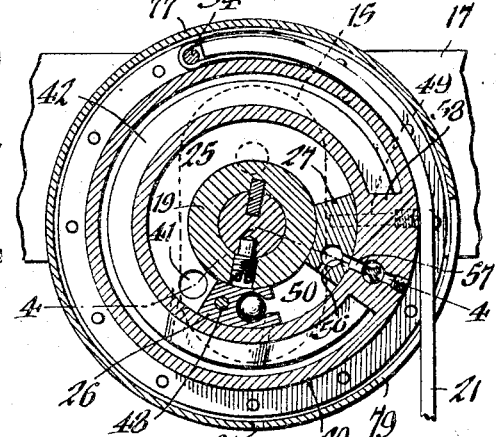
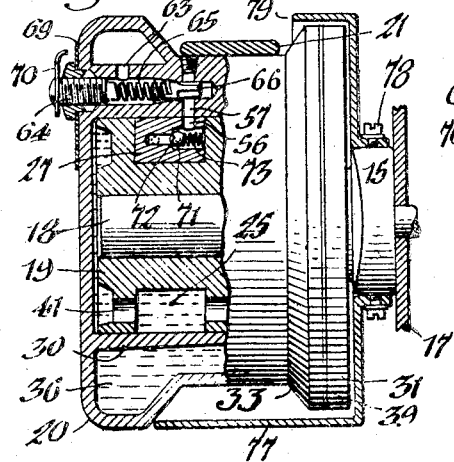
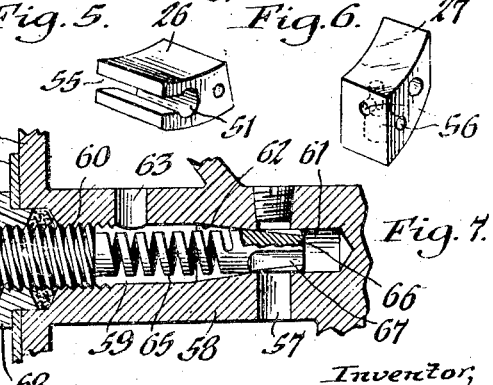
Inventor,
Charles W. Manzel,
by Geyer & Geyer
Attorneys.

Jan. 17, 1928.  1,656,744
C. W. MANZEL
HYDRAULIC SHOCK ABSORBER
Filed Jan. 8, 1927  2 Sheets-Sheet 2
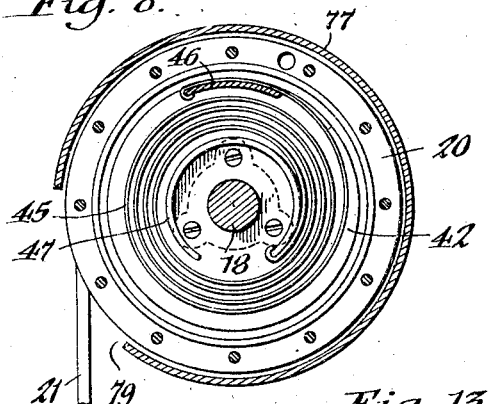
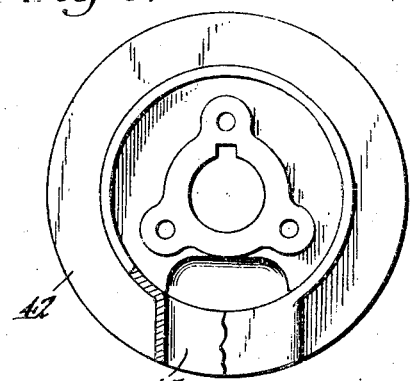
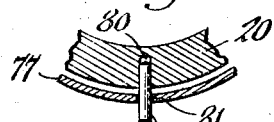
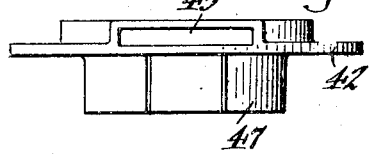
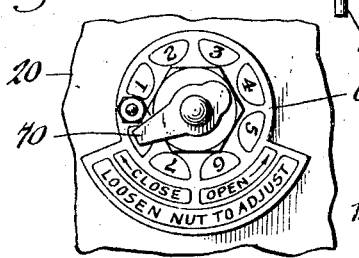
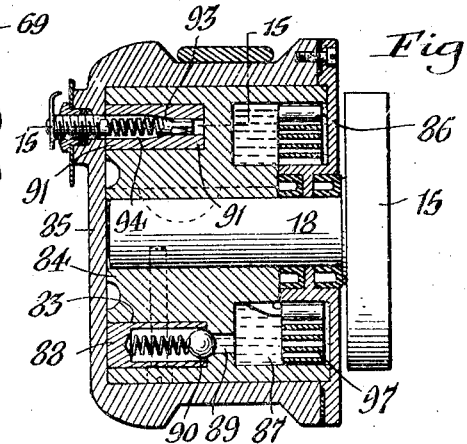
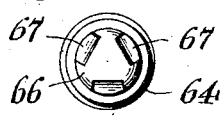
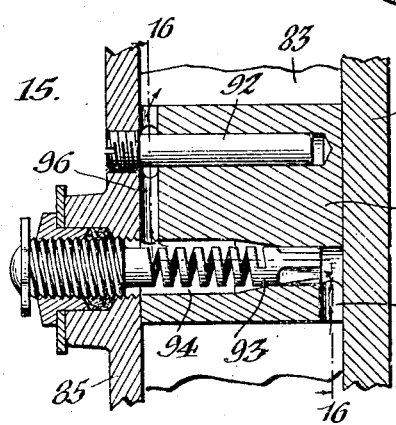
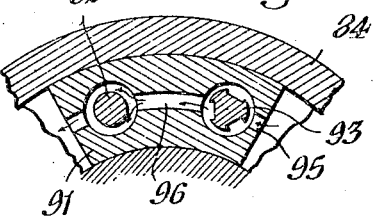
Inventor,
Charles W. Manzel,
by Geyer & Geyer
Attorneys.

Patented Jan. 17, 1928.

1,656,744

UNITED STATES PATENT OFFICE.

CHARLES W. MANZEL, OF BUFFALO, NEW YORK.

HYDRAULIC SHOCK ABSORBER.

Application filed January 8, 1927. Serial No. 159,818.

This invention relates to improvements in shock absorbers which are particularly intended for use on automobiles and other vehicles.

Its chief objects are to provide a simple and efficient shock absorber of the rotary hydraulic type which will effectually check the rebound action of the vehicle springs and insure easy and comfortable riding to the occupants of the vehicle, and which is designed for universal adaptation to the various makes of automobiles now on the market.

Other objects of the invention consist in the novel features of construction and arrangement of parts hereinafter referred to and particularly pointed out in the appended claims.

In the accompanying drawings:

Figure 1 is a side elevation of the improved shock absorber applied to a motor vehicle. Figure 2 is an enlarged transverse section thereof on line 2—2, Fig. 1. Figure 3 is a vertical section thereof on line 3—3, Fig. 2. Figure 4 is a transverse section taken substantially in the plane of line 4—4, Fig. 3. Figs. 5 and 6 are perspective views of the stator and rotor blades, respectively. Figure 7 is an enlarged detailed section of the regulating discharge valve. Figure 8 is a vertical section on line 8—8, Fig. 2. Figure 9 is a front view of the intake plate. Figure 10 is a bottom edge view thereof. Figure 11 is an enlarged front view of the regulating valve and its setting mechanism. Figure 12 is a front end view of the regulating valve. Figure 13 is a fragmentary sectional view of the means for holding the parts of the shock absorber in neutral position preparatory to installation. Figure 14 is a transverse section, similar to Fig. 2, showing a modified form of the invention. Figure 15 is an enlarged fragmentary horizontal section on line 15—15, Fig. 14. Figure 16 is a fragmentary vertical section taken in the plane of line 16—16, Fig. 15.

Similar characters of reference indicate corresponding parts throughout the several views.

In the preferred embodiment of the invention shown in Figs. 1—13 inclusive, 15 indicates a supporting bracket fastened by a bolt or bolts 16 to the vehicle frame 17 and having a horizontal stud or stub-shaft 18 projecting forwardly therefrom. Mounted on this stud is the stationary element or stator 19 of the device and applied to and surrounding the stator is a rotating element or rotor 20 connected by a flexible strap 21 with the axle 22 of the vehicle.

The stator is secured to the stud 18 by a key 23 and pin 24 which prevent both circumferential and axial movement of the stator relative to the stud. Formed between the stator and the rotor and preferably by the provision of an annular groove in the stator, an operating chamber 25 is produced in which a stator-blade 26 and a rotor-blade 27 are arranged for relative circumferential movement.

The rotor is of cylindrical form and consists of a casing or housing having a solid front wall 28, an outer wall 29 and an inner concentric wall 30 which engages and is rotatably mounted on the stator, as shown in Fig. 2. Applied to the open rear end of the rotor is a cover plate 31 whose hub 32 is disposed between the opposing faces of the bracket 15 and stator 19. In its exterior face, the outer wall of the rotor has an annular groove 33 in which the strap 21 is guided, the upper end of the latter being fastened to the rotor by a removable pin 34 while its lower end is attached to a suitable fitting 35 applied to the axle, as shown in Figs. 1, 2 and 3. The rear end of the inner rotor wall terminates a suitable distance from the cover plate 31 to form an oil reservoir or replenishing chamber 36 which includes the annular space between the concentric rotor-walls 29, 30, the lateral space between the cover plate and the stator and the space between the latter and the front wall 28 of the rotor. This reservoir is filled with a fluid, such as castor oil and alcohol, through a suitable opening 37 normally closed by a plug 38. The fluid level is indicated in Fig. 2 and is such as to provide an air space above it to permit the proper functioning of the device. Leakage of fluid from the reservoir is prevented by packings 39, 40 placed between the outer wall of the rotor and cover plate and between the stator-supporting stud and the cover plate hub, respectively. These packings are preferably of an oil-proof material and the double packings 40 seated in the cover plate hub are U-shaped in cross-section and function partially as valves, in that while permitting the admission of air into the reservoir, they effectually prevent the expulsion of fluid therefrom. The blade-operating chamber 25 is in constant communication with the reservoir through ports 41 formed in its opposite side walls and located at a point near the end of the counter-clockwise stroke of the rotor-blade 27, as shown in Figs. 3 and 4.

Disposed in the lateral portion of the reservoir 36 between the cover plate 31 and the stator is an intake plate 42 fastened to the inner end of the latter by screws or other fastenings and provided with a radial intake port 43 opening at its lower or outer end into the reservoir. Its inner or upper end communicates with the operating chamber 25 through the adjoining stator-port 41. During the operation of the shock absorber, the oscillating movement of the rotor throws the fluid outward by centrifugal force against the outer wall of said rotor, and by providing the intake port 43 as shown, the same is always covered and immersed in the fluid, insuring the delivery of the necessary amount of fluid to the operating chamber at all times. A suitable packing 44 may be interposed between the intake plate and the end wall of the stator.

A spiral spring 45 is employed for automatically winding up any slack in the strap 21 and maintaining it taut. This spring is located in the reservoir between the cover plate 31 and the intake plate 42 and is enclosed within arcuate flanges 46, 47 formed on these parts, the outer and inner ends of the spring being suitably fastened to the corresponding flanges, as shown in Figs. 2 and 8. The spiral spring tends to turn the rotor in a counter-clockwise direction, as when the vehicle-body approaches the axle due to a sudden bump or other defect in the road.

The blades 26, 27 are preferably in the form of segmentally-shaped blocks, as shown in Figs. 3, 5 and 6 and occupy the full cross-sectional area of the operating chamber 25. The stator blade 26 is disposed in the lower side of the chamber and is fixed to the stator 19 by a transverse pin 48, while the rotor blade 27 is fastened by a radial pin 49 with the rotor 20 and is movable in a circular path with the latter toward and from the stator blade. In the normal position of the shock absorber shown in the drawings, the rotor-blade is spaced a suitable distance from the stator blade, both blades having valve-controlled ports for admitting and expelling oil to and from the operating portion 50 of the chamber 25. To this end, the stator blade has a transverse oil passage 51 which communicates at its ends with alining inlet ports 52 in the stator, the opposing inner ends of such inlet ports constituting valve seats against which suction valves 53 are normally held by a coil spring 54, as shown in Fig. 2. In its end wall, this stator blade has a transverse slot or port 55 which intersects the passage 51 and establishes communication between the latter and the operating portion 50 of the chamber 25. Thus, when the rotor is moved in a counter clockwise direction, as when the vehicle body approaches the axle, a partial vacuum is created in the operating portion of said chamber, opening the valves 53 and allowing oil to be quickly drawn from the reservoir into said operating portion through the port 43 of the intake plate 42, the ports 52, the passage 51 and the port 55. The oil in the remaining or low pressure portion of the operating chamber between the advancing face of the rotor blade and the opposing face of the stator blade is discharged into the reservoir through the ports 41. As shown in Fig. 2, the inlet port 52 in the rear wall of the stator communicates with the port 43 in the intake plate, said last-named port being of the proper width to embrace such stator port 52 and its companion port 41.

The rotor blade 27 has an angle-shaped oil outlet port 56, one end of which opens into the operating portion 50 of the chamber 25 while the other end communicates with a radial passage 57 in the adjoining bridge wall 58 connecting the concentric walls 29, 30 of the rotor 20, as shown in Figs. 3 and 4. Arranged transversely of this bridge wall is an opening 59 having a threaded outer portion 60 and terminating at its inner end in a reduced portion or choke port 61 joined with the main body of said opening by a tapered seat 62. A port 63 connects the opening 59 with the reservoir 36. Adjustable lengthwise of this opening is a pressure-controlled regulating valve for controlling the expulsion of oil from the operating portion 50 of the chamber 25 when the rotor is turned in a clockwise direction to absorb the shocks incident to the vehicle encountering a bump in the road. This valve preferably consists of a threaded head 64 engaging the threaded opening 60, a yieldable stem 65 formed by milling a spiral slot therein, and a valve-plug 66 extending into the port 61 and having a plurality of longitudinal fluid escapement grooves 67 formed in its surface for regulating the discharge of oil through said port in accordance with the pressure created in the operating chamber. These grooves extend from the inner end of the valve to a point short of its yieldable stem 65 and their bottoms are tapered inwardly, as shown in Fig. 7. In the normal position of the valve shown in the drawings, its grooved valve-plug 66 extends over the outer end of the radial passage 57 in the bridge wall. By milling the spiral slot in the stem 65, a self-contained, normally neutralized spring is formed thereon, whereby the valve-plug is permitted to open more or less, each coil of the spring responding uniformly to the oil pressure exerted on said plug. The shallow outer ends of the escapement grooves 67 discharge the fluid into the tapered portion 62 of the opening 59.

This regulating valve is set at a predetermined tension depending on the pressure desired for a given installation, the adjustment being effected by screwing the valve toward or from the seat 62 and locking it in a set position by a locknut 68. To facilitate this adjustment, a dial plate 69 is applied to the front wall of the rotor about the threaded head 64 of the valve and a pointer 70 is fixed on the latter and is adapted to traverse the dial. Predetermined tests govern the proper setting of the pointer for a given make of car, the position of the regulating valve depending on the car-weight or load and its suspension spring action. Said regulating valve constitutes the controlling element of the shock absorber in that it governs the flow of fluid from the operating chamber into the reservoir and automatically proportions the hydraulic resistance to the intensity or severity of the shock resulting from the vehicle striking a bump or other obstruction in the roadway. While effectually checking the rebound of the vehicle-body in this manner, the tensioned valve-plug 66 permits the discharge of fluid from the operating chamber at a rate to effect the prompt return of the vehicle springs to their normal position. Furthermore, the tapered escapement grooves 67 of the valve-plug permit a gradual expansion of the fluid under pressure as it passes from the port 61 into the tapered portion 62 of the opening 59, thus relieving such pressure gradually during the clockwise stroke of the rotor and producing a soft cushioning action which affords smooth and comfortable riding to the occupants of the vehicle.

Disposed in the passage through which the fluid is discharged from the operating chamber into the reservoir on the return or shock absorbing stroke of the rotor, and preferably in the rotor-blade port 56, which constitutes a part of such discharge passage, is a check valve 71 normally held against its seat 72 by a spring 73. While this check valve does not interfere with the discharge of oil from the operating chamber into the reservoir, it does check any return flow of the oil and forms an oil seal between the regulating valve and said operating chamber. It further prevents any air being sucked from the reservoir past the regulating valve into the operating chamber and particularly when such valve is located at the top of the shock absorber by reason of the rotor having turned in a counter-clockwise direction to bring the valve to such position.

The stator bracket 15 is preferably in the form of an elongated plate and may be secured to the vehicle-frame 17 in a horizontal position in which it extends lengthwise of the frame or it may be secured in a pendant position, as shown in Figs. 1, 2 and 3. For the purpose of adjusting this bracket in the last-named position and adapt it to various installations, its lower end may be provided with a stud bolt 74 for receiving a block 75, one or another of whose faces is adapted to bear against the underside of the vehicle-frame. It will be noted that the faces of this block are located at different radial distances from its axis to obtain the adjustments desired. Said block is removably held in place on its bolt by nut 76.

Extending around and over the rear side of the rotor 20 is a hood 77 which is fastened by screws 78 to the stator-bracket 15, as shown in Fig. 2. In its side, this hood has an opening 79 through which the strap 21 passes.

When assembled, the shock absorbers are set in a neutral position to thereafter facilitate their installation on the vehicle. To maintain the same in such neutral position, the rotor is provided in its periphery with a radial opening 80 and the hood 77 has a similar opening 81. After the rotor is turned to its neutral position, these openings are in alinement and a pin 82 is used for holding the rotor in such position, as seen in Fig. 13. When the shock absorber is secured to the vehicle-frame and its strap 21 is attached to the axle, the pin 82 is removed, thus setting the device in proper position for operation.

Briefly stated, the operation of the shock absorber is as follows:—

Normally, the stator- and rotor-blades and associated parts assume the position shown in the drawings. When the vehicle-body and axle approach each other due to a bump, obstruction or other defect in the road, the spiral spring 45 causes the rotor 20 to turn in a counter-clockwise direction and wind the resulting slack in the strap 21 thereon. During the turning of the rotor in this direction, its blade 27 is carried with it, the oil contained in that portion of the chamber 25 in advance of said blade being displaced through the ports 41 into the reservoir 36, while the operating portion 50 of such chamber is supplied with oil from the reservoir through the intake port 43, valve ports 52, passage 51 and slotted port 55. When the vehicle-body and axle recede from each other to assume their normal relative positions, the shock-absorbing qualities of the device to check the rebound of the body are brought into play, the return movement of the rotor being resisted by the oil in the operating portion 50 of the chamber 25, through which the oil is expelled into the reservoir at a predetermined pressure through the rotor-blade port 56, passage 57, port 61 controlled by the regulating valve-plug 66, opening 59, and port 63.

In the modified form of the invention shown in Figs. 14, 15 and 16, the annular operating chamber 83 is formed in the front end wall of the stator 84 and the front wall of the rotor 85 extends over the same, the rear end of the stator bearing against the rotor cover plate 86. This operating chamber is in constant communication with the reservoir 87, as in the previously described construction and the ported stator-blade 88 communicates with a fluid inlet port 89 controlled by a suction-operated valve 90. The rotor-blade 91 is secured to the rotor by a pin 92 and the regulating discharge valve 93 extends through the front wall of said rotor and into a passage 94 in its blade, as shown in Fig. 15. When the rotor is turned in a clockwise direction, the fluid is discharged from the operating chamber into the reservoir through a port 95 in the rear wall of the rotor-blade past the regulating valve 93 into the passage 94, and thence through a port 96 in the front wall of the rotor-blade, the last-named port extending in part around the outer end of the pin 92. As in the previous construction, the spring 97 for moving the rotor in a counter-clockwise direction is fastened at one end to the rotor and at its other end to the stator.

I claim as my invention:—

1. A shock absorber, comprising a stator, a rotor mounted on said stator and containing a fluid reservoir, an operating chamber formed between the stator and the rotor and communicating with said reservoir, blades carried by said stator and said rotor and arranged in the operating chamber, the stator and its blade and the rotor and its blade having intercommunicating ports for the passage of fluid from the reservoir into the operating chamber and from the latter to the former, respectively, a valve applied to the stator-blade port for controlling the flow of fluid into the operating chamber when the rotor is turned in one direction, a valve applied to the rotor-blade ports for regulating the discharge of fluid from said operating chamber when the rotor is turned in the reverse direction, and a check valve in the rotor blade port for preventing the passage of air and fluid from the reservoir into the operating chamber.

2. A shock absorber, comprising a stator, a rotor mounted on said stator and containing a fluid reservoir, an operating chamber formed between the stator and the rotor and communicating with said reservoir, blades carried by the stator and the rotor and arranged in said operating chamber, and means for automatically controlling the admission and expulsion of fluid to and from the operating chamber, the stator having an intake port communicating at its inner end with the operating chamber and at its outer end with the lower portion of the reservoir.

3. A shock absorber, comprising a stator, a rotor mounted on said stator and enclosing the same, said rotor containing a fluid reservoir, an operating chamber formed between the stator and the rotor and communicating with said reservoir, a plate applied to one of the end walls of the stator and having a substantially radial intake port opening at its outer end into the reservoir and communicating at its inner end with the operating chamber, blades carried by the stator and the rotor and arranged in said chamber, and means for automatically controlling the admission and expulsion of fluid to and from said operating chamber.

4. A shock absorber, comprising a stator, a rotor mounted on said stator and containing a fluid reservoir, the rotor including a cylindrical casing closed at its front side, a cover plate applied to its rear side and arranged to form a space constituting a part of the reservoir between said cover plate and the opposing rear end of the stator, an operating chamber formed between the stator and the rotor and communicating with said reservoir, a plate applied to the rear end of the stator and having a substantially radial intake port opening at its outer end into said reservoir and communicating at its inner end with the operating chamber, blades carried by the stator and the rotor and arranged in said operating chamber, means for controlling the admission of fluid from said reservoir into the operating chamber when the rotor is turned in one direction, a spiral spring arranged in the space between the rotor cover plate and the stator intake plate and connected at its ends to said parts for constantly urging the rotor in such direction, and means for controlling the discharge of fluid from said operating chamber when the rotor is turned in the reverse direction.

5. A shock absorber, comprising a stator, a rotor mounted on said stator and containing a fluid reservoir, said rotor including a cylindrical casing having inner and outer concentric walls, a front wall and a cover plate, an annular operating chamber between the stator and the rotor, a closure for the rear end of the stator having an intake port for the passage of fluid from the reservoir into the operating chamber, blades carried by the rotor and the stator and arranged in said operating chamber, and means for automatically controlling the charging and discharging of the fluid to and from the operating chamber.

6. A shock absorber, comprising a stator, a rotor mounted on said stator and containing a fluid reservoir, said rotor including a cylindrical casing having inner and outer concentric walls, a front wall and a cover plate, an annular operating chamber between the stator and the rotor, a closure for the rear end of the stator having an intake port for the passage of fluid from the reservoir into the operating chamber, blades carried by the rotor and the stator and arranged in said operating chamber, said stator and its blade having interconnecting ports communicating with the intake port of said stator-closure for permitting the passage of fluid from the reservoir into said chamber when the rotor is turned in one direction, a valve applied to the stator-blade for controlling said ports, said rotor and its blade having interconnecting ports for establishing communication between the operating chamber and said reservoir when the rotor is turned in the opposite direction, and a valve applied to the rotor for controlling said last-named ports.

7. A shock absorber, comprising a stator, a rotor mounted on said stator and containing a fluid reservoir, an operating chamber formed between the stator and the rotor and in constant communication with the reservoir through a port formed in said stator, a plate applied to the rear wall of the stator and having an intake port opening at its outer end into the reservoir and at its inner end into the operating chamber, said stator port communicating with said intake port, blades carried by the rotor and the stator and arranged in said chamber, said stator and its blade having interconnecting ports communicating with the intake port of the stator-plate for permitting the passage of fluid from the reservoir into said chamber when the rotor is turned in one direction, a valve applied to the stator-blade for controlling its ports, said rotor and its blade having interconnecting ports for establishing communication between the operating chamber and said reservoir when the rotor is turned in the reverse direction, and a valve applied to the rotor for controlling said last-named ports, the stator-blade ports and the rotor-blade ports opening into that portion of the operating chamber between the opposing front faces of the respective blades, and the first-named stator-port being located in a side wall of the operating chamber adjacent the rear face of said stator-blade.

8. A shock absorber, comprising a stator, a rotor mounted on said stator and containing a fluid reservoir, an operating chamber formed between the stator and the rotor and in communication with said reservoir, blades carried by the rotor and the stator and arranged in said operating chamber, the stator and its blade and the rotor and its blade, having intercommunicating ports for the passage of fluid from the reservoir into the operating chamber and from the latter to the former, respectively, a valve applied to the stator blade for controlling the flow of fluid into the operating chamber when the rotor is turned in one direction, a regulating valve applied to the rotor for controlling the discharge of fluid from said operating chamber when the rotor is turned in the reverse direction, and means for predetermining the setting of said regulating valve in its normal position for a given installation.

9. The combination with an hydraulic shock absorber having a passage including a choke port for the discharge of fluid under pressure, of a regulating valve for controlling the discharge of fluid through said passage including an adjustable head at its rear end, a piston-valve at its front end guided in said choke port and having a plurality of longitudinally-extending grooves in its surface, said grooves decreasing in depth from the front end of the valve to the rear end thereof, and an intermediate yieldable stem connecting said piston-valve with said head.

10. A shock absorber, comprising a stator having an annular groove in its end wall, a rotor mounted on said stator and containing a fluid reservoir, said rotor including a cylindrical casing whose front wall extends over the stator and forms with its groove an operating chamber communicating with said reservoir, blades carried by the rotor and the stator and arranged in said operating chamber, said stator and its blade having a valve-controlled port for establishing communication between the reservoir and the operating chamber when the rotor is turned in one direction, said rotor blade having a port for establishing communication between those portions of the operating chamber on either side of such blade, and a valve applied to the rotor-blade port for controlling the discharge of fluid therethrough when the rotor is turned in the reverse direction.

11. A shock absorber, comprising a stator having an annular groove in its end wall, a rotor mounted on said stator and containing a fluid reservoir, said rotor including a cylindrical casing whose front wall extends over the stator and forms with its groove an operating chamber communicating with said reservoir, blades carried by the rotor and the stator and arranged in said operating chamber, said stator and its blade having a valve-controlled port for establishing communication between the reservoir and the operating chamber when the rotor is turned in one direction, said rotor-blade having a transverse passage and oppositely-extending ports leading therefrom and communicating with said operating chamber, and a valve carried by the rotor and arranged in said passage for controlling the discharge of fluid therethrough when the rotor is turned in the reverse direction.

12. In a shock absorber, the combination with a vehicle frame and axle, of a stator mounted on the frame, a rotor journaled on the stator and containing a fluid reservoir, an operating chamber disposed between the stator and the rotor and communicating with said reservoir, blades carried by the stator and the rotor and arranged in said chamber for relative movement as the rotor is turned in one direction or the other, a closure for the rear end of the stator having an intake port for the passage of fluid from the reservoir into the operating chamber, means for automatically controlling the admission and expulsion of fluid to and from the operating chamber, a spring arranged in said reservoir and connected at one end to the rotor and at its other end to the stator-closure for constantly urging the rotor in one direction, and a flexible member connecting said rotor with the axle for moving it in the opposite direction.

CHARLES W. MANZEL.